United States Patent
Zukas et al.

Patent Number: 5,944,935
Date of Patent: Aug. 31, 1999

[54] PREPARATION OF ADHESIVELY BONDED SANDWICH STRUCTURES

[76] Inventors: Florian J. Zukas, 2355 W. 229th St., Torrance, Calif. 90501; John P. Stafford, 5220 Ave de Kristina, Yorba Linda, Calif. 92687; Nancy J. Condon, 1823 Marshallfield La., Redondo Beach, Calif. 90278

[21] Appl. No.: 08/686,637

[22] Filed: Jul. 24, 1996

[51] Int. Cl.$^6$ .............................. B29C 65/48; B29C 65/52
[52] U.S. Cl. ...................... 156/285; 156/249; 156/309.9; 156/252
[58] Field of Search .................... 156/292, 252, 156/285, 249, 308.4, 309.9

[56] References Cited

U.S. PATENT DOCUMENTS

| | | | |
|---|---|---|---|
| 3,784,395 | 1/1974 | McKown | 156/292 X |
| 4,155,800 | 5/1979 | Wilson | 156/497 |
| 4,249,974 | 2/1981 | Wilson | 156/85 |
| 4,541,879 | 9/1985 | Riel | 156/292 X |
| 4,990,391 | 2/1991 | Veta et al. | 156/292 X |
| 5,006,391 | 4/1991 | Biersach | 156/292 X |

*Primary Examiner*—Francis J. Lorin
*Attorney, Agent, or Firm*—Terje Gudmestad; Georgann Grunebach; Michael W. Sales

[57] ABSTRACT

A face sheet is bonded to a porous core by contacting adhesive to the porous core at the bonding face, placing a screen stripping sheet overlying the adhesive, and pressing on the stripping sheet while heating the core and adhesive. The adhesive is thereby forced against the exposed portions of the cell walls at the bonding face and into the interstices of the stripping sheet. The excess adhesive not contacting the exposed cell walls is removed by cooling the stripping sheet and adhesive, and peeling the stripping sheet and excess adhesive from the core. A face sheet is bonded to the porous core with the remaining adhesive that adhered to the exposed cell walls.

11 Claims, 2 Drawing Sheets

PREPARATION OF ADHESIVELY BONDED SANDWICH STRUCTURES

BACKGROUND OF THE INVENTION

This invention relates to bonded sandwich structures used for structural applications, and, more particularly, to the reduction in weight of such structures without loss of mechanical properties.

Adhesively bonded sandwich structures are widely used in applications such as aircraft and spacecraft, where high stiffness is required with minimal weight. In such a structure, face sheets, typically aluminum or composite material panels, are joined to each side of a core, typically metallic or nonmetallic honeycomb. The honeycomb holds the face sheets at the required positions. This structural element provides high panel stiffness and strength with minimal weight.

A key to the construction of the adhesively bonded sandwich structure is the method of joining the face sheets to the core. An adhesive is placed between the face sheet and the core, the face sheet is pressed to the core, and the adhesive is cured. However, if the adhesive is applied in bulk, the amount applied is usually in excess of that required, resulting in the addition of unproductive weight to the structure. To apply exactly the right amount of adhesive in a convenient form, film adhesives have been developed and are commercially available. The film adhesive is a curable adhesive sheet, typically about 0.003 inch thick and weighing on the order of 0.02 pounds per square foot. To construct a panel using a film adhesive, the film adhesive is placed between the core and the face sheet, the array is pressed together, and the adhesive is cured.

This film adhesive approach works well, is convenient to use, reduces the weight of adhesive in the structure to the thickness required, and is widely used in the industry. However, it has been recognized that some of the adhesive applied by this approach is not effective in bonding the structure. Specifically, that portion of the adhesive which does not contact the exposed honeycomb walls to which the face sheet is bonded adds weight but not strength to the structure.

It has been proposed to selectively perforate the film adhesive to reduce its weight. This approach is not satisfactory for use in many manufacturing operations, because a slight misalignment of the perforations and the honeycomb results in unbonded areas of the face sheet. Perfect alignment of hundreds of tiny perforations with the honeycomb cells is not possible practically. It is also known to preferentially position the adhesive at node locations in the honeycomb, but such approaches do not reduce the weight of the sandwich.

There is a need for a commercially practical approach for reducing the weight of adhesively bonded honeycomb and similar types of structures. The current invention fulfills this need, and further provides related advantages.

SUMMARY OF THE INVENTION

The present invention provides a structure of face sheets adhesively bonded to a porous cellular core, and a method for manufacturing that structure. The adhesive may be supplied in the convenient film adhesive or paste forms, but the weight of adhesive is reduced in the final bonded structure. The approach of the invention is compatible with conventional manufacturing processes, and requires only a few additional steps to remove a significant amount of weight from the structure. No new materials of construction are required.

In accordance with the invention, a method for preparing a structure having a face sheet bonded to a porous core comprises the steps of furnishing a porous core comprising a plurality of cell walls and having a bonding face at which the cell walls are exposed, applying a layer of adhesive to only the exposed portions of the cell walls at the bonding face, and bonding a face sheet to the porous core with the adhesive layer on the exposed portions of the cell walls.

A key to the present invention is the ability to provide adhesive only to those portions of the cell walls where bonding of the face sheets to the core occurs, and in the correct amount at those locations. In a preferred approach, the step of providing includes the steps of contacting a sheet of film adhesive or adhesive paste to the porous core at the bonding face, causing adhesive in the film adhesive to selectively adhere to the exposed portions of the cell walls, and removing those portions of the film adhesive or adhesive paste not contacting the exposed portions of the cell walls. The removing is accomplished by placing a stripping sheet, preferably a screen having interstices therein, overlying the sheet of film adhesive or adhesive paste prior to the step of causing selective adherence, cooling the stripping sheet to cool the adhesive and make it somewhat brittle, and peeling the stripping sheet and that portion of the adhesive not contacting the cell walls from the core. The stripping sheet is preferably placed overlying the adhesive prior to the step of causing adhesive to selectively adhere. This step is thence accomplished by forcing the stripping sheet and adhesive against the core at an elevated temperature sufficient to achieve flow of the adhesive onto the cell walls and into the interstices of the stripping sheet, but at a temperature sufficiently low that staging (curing) of the adhesive does not occur.

In this approach, that portion of the adhesive which does not contact the cell walls fractures and peels away with the stripping sheet. That portion of the adhesive at the cell walls remains in place and in the structure for subsequent bonding of the face sheet to the core. The bond of the face sheet to the core is just as strong as achieved with a greater weight of adhesive, because only the nonfunctioning portion of the adhesive is removed.

The adhesively bonded sandwich structure of the invention is unique. It has the high stiffness of a conventional bonded structure, but has reduced weight. Other features and advantages of the invention will be apparent from the following detailed description of the preferred embodiment, taken in conjunction with the accompanying drawings, which illustrate, by way of example, the principles of the invention.

DETAILED DESCRIPTION OF THE INVENTION

Figure 1:
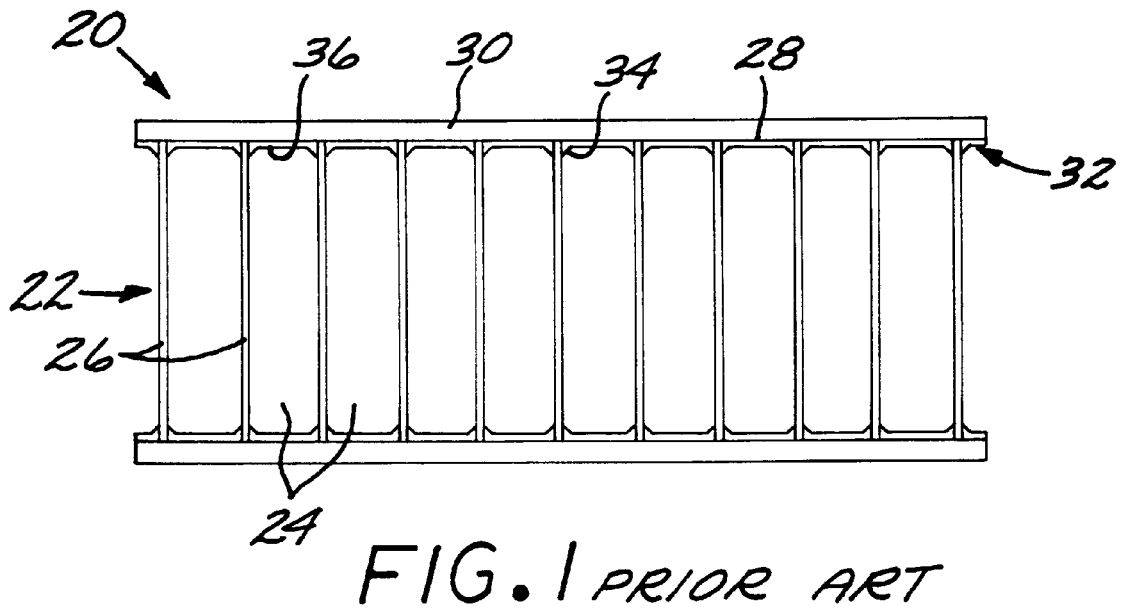
FIG. 1 is a side sectional view of an adhesively bonded honeycomb structure made by a conventional approach.

FIG. 1 depicts a conventional adhesively bonded honeycomb structure 20. The structure 20 includes a honeycomb core 22 having individual hexagonal cells 24. The cells 24 are formed of cell walls 26. Bonded onto each of the opposing bonding faces 28 of the honeycomb core 22 is a face sheet 30. Each face sheet 30 is adhesively bonded to the core 22 with an adhesive layer 32. Before bonding, the adhesive layer 32 is a flat sheet layer. After bonding, and as shown in FIG. 1, the adhesive layer 32 forms fillets 34 with each of the cell walls 26. Unused and unbonded adhesive from the original sheet of adhesive, indicated as numeral 36, remains in the interior of the hexagonal cells 24. The unused and unbonded adhesive 36 adds weight but not strength to the structure 20.

Figure 2:
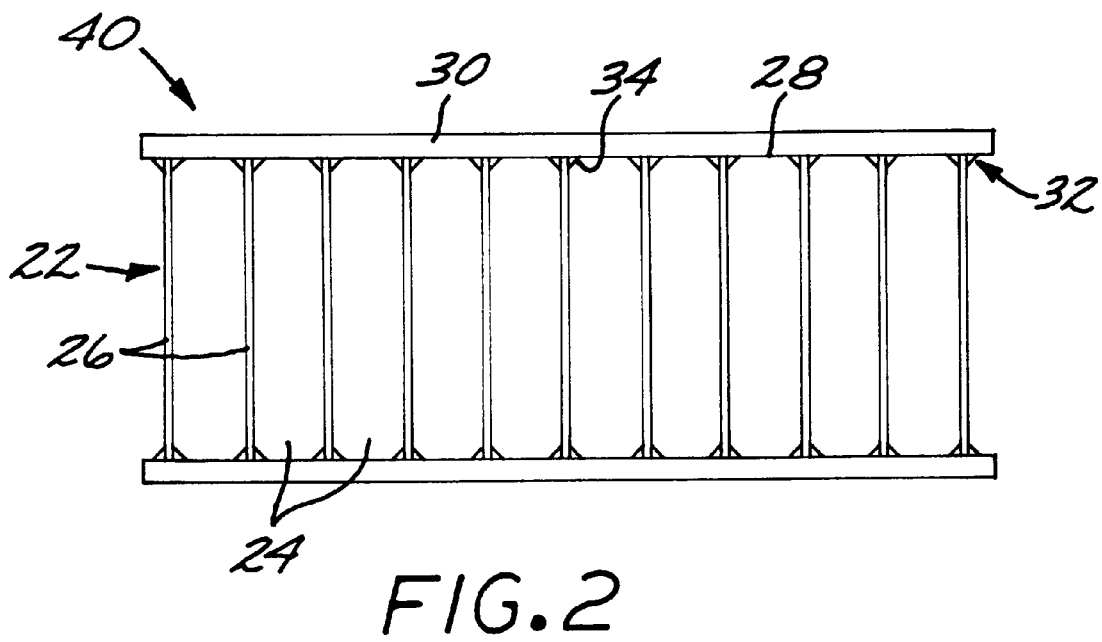
FIG. 2 is a side sectional view of an adhesively bonded honeycomb structure made by the approach of the invention.

FIG. 2 depicts an adhesively bonded honeycomb structure 40 made according to the present invention. The structure is similar to that in FIG. 1 in some respects, and the same identifying callout numerals have been used to denote comparable elements. The difference is that the unused and unbonded adhesive (numeral 36 of FIG. 1) has been eliminated. The only adhesive is that in the fillets 34, bonding the cell walls 26 to the face sheets 30. Elimination of the unused and unbonded adhesive according to the present approach typically saves as much as 25 pounds in weight in a spacecraft that has about 2000 square feet of adhesively bonded honeycomb structure.

Figure 3:
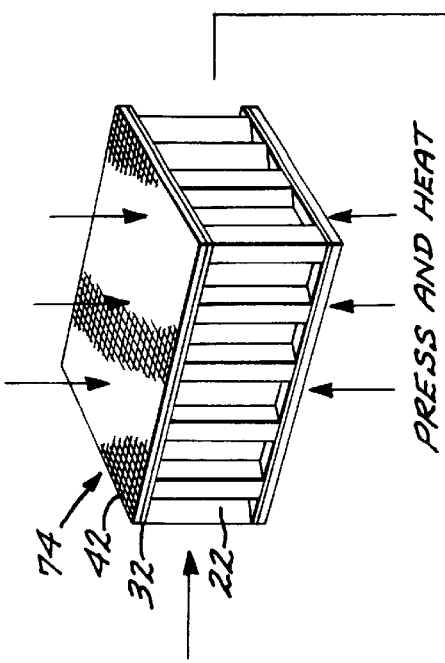
FIG. 3 is a pictorial flow diagram for the method of the invention, illustrating the structure at various steps of the fabrication process.
Figure 3:
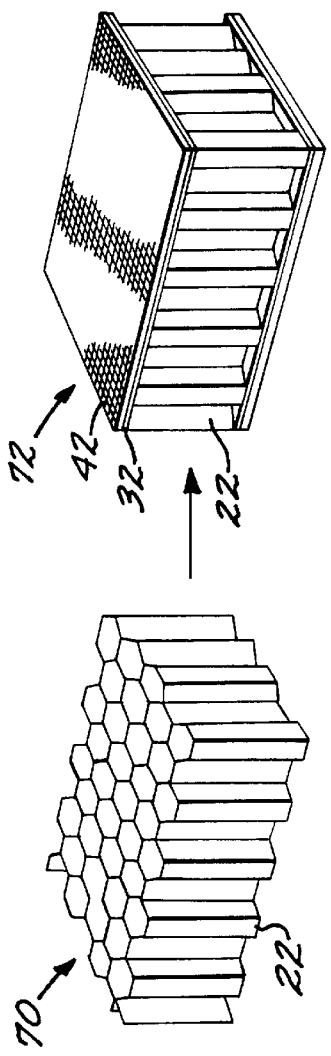
Figure 3:
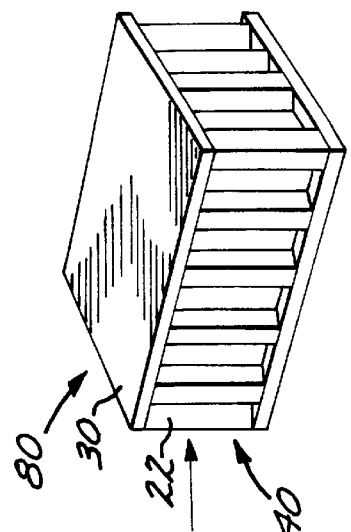
Figure 3:
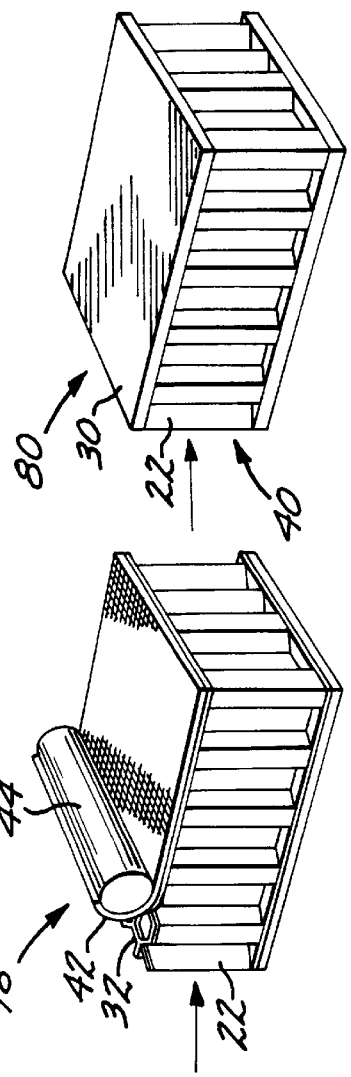
Figure 3:
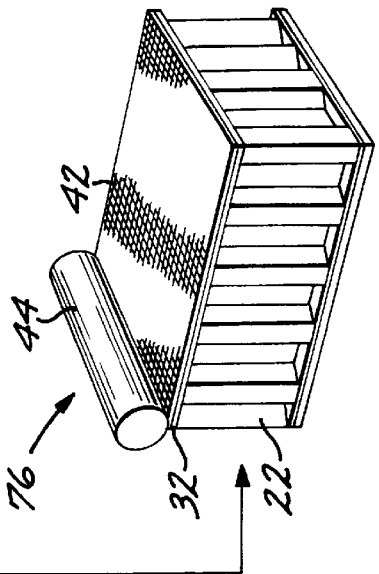

FIG. 3 shows in pictorial form the preferred method for preparing the adhesively bonded structure 40 of FIG. 2. First, a piece of honeycomb core material 22 is furnished, numeral 70. Such honeycomb core materials are well known in the art and available commercially. A typical honeycomb core material has ⅜ inch maximum dimension hexagonal cells with cell walls 0.0015 inches thick. The honeycomb material may be made of metallic or non-metallic material. The preferred honeycomb material made of aluminum alloy has a density of about 4.4 pounds per cubic foot and is available commercially from, for example, Hexcel Corporation. In elevational or side sectional view, the honeycomb core material 22 presents a view of the cell walls 26. From the top in plan view, the hexagonal pattern of the cell walls as they define the bonding faces 28 may be seen. While a hexagonal honeycomb structure is preferred, the present invention is operable with other types of porous-material cores, such as, for example, open-cell or closed-cell sponge-like materials or honeycomb materials having non-hexagonal cells.

An adhesive layer 32 is placed onto the exposed bonding face 28 and a stripping layer 42 is placed on top of the adhesive layer 32, numeral 72. (The processing will be described for the bonding of the top face sheet to the core, but the same steps are performed for the bonding of the bottom face sheet. The preferred structure of FIG. 2 has both a top face sheet and a bottom face sheet.) The adhesive layer 32 is preferably a commercial film adhesive material, available from companies such as Cytec (previously American Cyanamid) and BASF. (The term "film adhesive" is a term of art for pre-packaged sheets of adhesive material.) The adhesive in the adhesive layer 32 is an epoxy or other curable polymeric material.

A preferred film adhesive material used for the adhesive layer 32 is a sheet made of the curable adhesive FM73. This adhesive cures at a temperature of about 250° F. The adhesive layer is about 0.004 inch thick, and has a weight of about 0.020 pounds per square foot. Equivalently for the present purposes, the adhesive layer 32 may be provided as a paste of adhesive and carrier applied to the bonding face of the honeycomb core. As used herein, "adhesive layer" includes a layer applied as a film adhesive, an adhesive paste, or other adhesive form. When either a film adhesive or an adhesive paste is applied, an excess of the adhesive material is present in the honeycomb interstices, which excess is removed by the stripping technique discussed next.

The stripping layer 42 is made of a material having interstices into which the adhesive may penetrate under elevated temperature and pressure. The preferred stripping layer 42 is a piece of screen material, preferably 14×16 mesh aluminum screen wire such as that used in home window screens. The weight of this material is not a consideration, inasmuch as it is removed and discarded during the processing operation and is not present in the final structure 40. Studies have also shown that the stripping layer 42 in some cases need not have interstices therein, as a chilled plate surface may also be used.

The stack of core 22, adhesive layer(s) 32, and overlying stripping layer(s) 42 is compacted with a pressure perpendicular to the bonding faces 28, and simultaneously heated, numeral 74. A preferred pressure of about 4–6 inches of mercury is readily applied by placing the stack into a vacuum bag and partially evacuating the interior. Such techniques are well known for bonding the face sheets in a subsequent step, but are here first applied in the application of the adhesive to the exposed ends of the cells 24. The stack in the vacuum bag is heated to a temperature sufficiently high to cause the adhesive in the adhesive layer 32 to flow, but not sufficiently high to cause it to cure (sometimes termed "stage"). The temperature is preferably about 140° F. for typical adhesive materials.

The combination of heat and pressure causes the portion of the adhesive contacting the bonding face 28 of the core 22 to flow around the ends of the cell walls 26 to form the fillets 34 of FIG. 2. The heat and pressure also causes the portion of the adhesive layer 32 contacting the stripping layer 42 to flow into the interstices of the stripping layer, in the preferred case the openings between the screen wires. When the stack is cooled, the bottom side of the adhesive layer has formed the fillets 34, and the top side is weakly bonded to the stripping layer 42. The unused and unbonded adhesive between the cell walls is present at this stage, but is removed in the next steps.

The adhesive 32 is cooled to a temperature at which it is slightly brittle, typically about −40° F., numeral 76. The cooling is conveniently accomplished by filling a hollow aluminum tube 44 with dry ice and placing the tube 44 into contact with the stripping layer 42. Heat is conducted from the adhesive 32, which is thereby cooled to the required temperature of slight embrittlement.

As shown at numeral 78, the stripping layer 42 is progressively removed by holding it in contact with the hollow tube 44 and rolling the tube slowly along the surface of the stripping layer 42. The stripping layer 42 is gradually removed, along with the adhesive that is retained in the interstices of the stripping layer. It has been found that the adhesive forming the fillets 34 is not removed, but remains adhered to the ends of the cell walls 26. The adhesive between the cell walls, the adhesive 36 of FIG. 1, adheres to the interstices of the stripping layer 42 and is removed. The progressive rolling action fractures the chilled adhesive 36 and permits its removal as the stripping layer 42 is removed. As noted above, the steps 72, 74, 76, and 78 are also performed for the bottom bonding face of the honeycomb core 22.

After the excess adhesive is removed, the face sheet 30 is bonded to the core 22 in the usual manner and cured, numeral 80. The face sheet 30 may be a metallic or non-metallic material, such as a polymer, a composite material, or a metallic alloy. Adhesive bonding is accomplished with only the adhesive remaining after the stripping step 78, but otherwise uses conventional procedures. In a preferred case, a face sheet of aluminum alloy about 0.010 inch thick is contacted to each of the bonding faces 28 of the core 22. The assembly is placed into a vacuum bag. Tooling is placed on each side to prevent warping. A vacuum is drawn to produce a continuous contact pressure pressing the face sheet to the honeycomb core of about 10–25 inches of mercury. While the pressure is applied, the vacuum bag and assembly are heated to elevated temperature for a period of time to cure the adhesive and bond the face sheets to the core. Typically, a temperature of about 250° F. and a holding time of about 1 hour are sufficient for this purpose.

To comparatively test the operability and functionality of the present invention, a conventional structure 20 (FIG. 1) and a structure 40 according to the present invention (FIGS. 2 and 3) were prepared using the techniques described herein. The core in each case was aluminum alloy hexagonal honeycomb with 3/8 inch cells and cell walls 0.0015 inches thick. The face sheets were 2024 aluminum alloy 0.010 inch thick. The adhesive was FM-73 film adhesive purchased from Cytec, which has a nominal weight of 0.020 pounds per square foot. Final curing was accomplished at a temperature of 250° F. for a time of 1 hour. The stripping layer 42 was a screen, as discussed above. Further studies using a chilled flat plate to strip the excess adhesive produced similar results.

The amount of adhesive in each completed structure was determined. The structure 20 had an average of 0.020 pounds per square foot, and the structure 40 of the invention had an average of about 0.006 pounds per square foot, although of course the adhesive is not uniformly distributed in the structure 40. The two adhesively bonded structures were mechanically tested in flatwise tension. The conventionally prepared structure 20 had a strength of 885 pounds per square inch, and the structure 40 of the invention had a strength of 910 pounds per square inch. Thus, the structure 40 of the invention had a lower adhesive weight and lower total weight, but lost no strength as a result of the reduction in adhesive weight.

Although a particular embodiment of the invention has been described in detail for purposes of illustration, various modifications may be made without departing from the spirit and scope of the invention. Accordingly, the invention is not to be limited except as by the appended claims.

What is claimed is:

1. A method for preparing a structure having a face sheet bonded to a porous core, comprising the steps of:

furnishing a porous core comprising a plurality of cell walls and having a bonding face at which the cell walls are exposed;

applying an adhesive layer to only the exposed cell walls at the bonding face, the adhesive being provided from a source selected from the group consisting of a film adhesive and a paste adhesive, the step of applying including the step of eliminating those portions of the adhesive not contacting the exposed portions of the cell walls completely the structure to reduce the weight of the structure; and bonding a face sheet to the porous core using the adhesive layer on the exposed portions of the cell walls, such that there is substantially no adhesive contacting the face sheet in the region between the cell walls.

2. The method of claim 1, wherein the step of applying includes the steps of contacting an adhesive to the porous core at the bonding face, causing adhesive to selectively adhere to the exposed portions of the cell walls, and thereafter removing those portions of the adhesive not contacting the exposed portions of the cell walls.

3. The method of claim 2, wherein the step of causing is accomplished by pressing the adhesive to the exposed portions of the cell walls at the bonding face, while heating the core and adhesive.

4. The method of claim 1, wherein the core is a honeycomb.

5. A method for preparing a structure having a face sheet bonded to a porous core, comprising the steps of:

furnishing a porous core comprising a plurality of cell walls and having a bonding face at which the cell walls are exposed;

applying an adhesive layer to only the exposed cell walls at the bonding face, the adhesive being provided from a source selected from the group consisting of a film adhesive and a paste adhesive, wherein the step of applying includes the steps of contacting an adhesive to the porous core at the bonding face, causing adhesive to selectively adhere to the exposed portions of the cell walls, and removing those portions of the adhesive not contacting the exposed portions of the cell walls, wherein the step of removing includes the steps of:

placing a stripping sheet overlying the adhesive, cooling the adhesive, and peeling the stripping sheet and a portion of the adhesive from the core; and bonding a face sheet to the porous core using the adhesive layer on the exposed portions of the cell walls, such that there is substantially no adhesive contacting the face sheet in the region between the cell walls.

6. The method of claim 5, wherein the step of placing is accomplished prior to the step of causing, and the steps of cooling and peeling are accomplished after the step of causing.

7. The method of claim 5, wherein the stripping sheet is a screen.

8. A method for preparing a structure having a face sheet bonded to a porous core, comprising the steps of:

furnishing a porous core comprising a plurality of cell walls and having a bonding face at which the cell walls are exposed;

contacting an adhesive to the porous core at the bonding face;

placing a stripping sheet overlying the adhesive;

pressing on the stripping sheet to force the adhesive against the exposed portions of the cell walls at the bonding face and into the pores of the stripping sheet, while heating the core and adhesive;

cooling the adhesive;

peeling the stripping sheet and a portion of the adhesive from the core; and bonding a face sheet to the porous core with the adhesive layer.

9. The method of claim 8, wherein the stripping sheet is a screen.

10. The method of claim 8, wherein the core is a honeycomb.

11. The method of claim 8, wherein the face sheet is made of a material selected from the group consisting of a polymer, a composite material, and a metallic alloy.

* * * * *